(12) United States Patent
Black et al.

(10) Patent No.: US 12,484,945 B2
(45) Date of Patent: Dec. 2, 2025

(54) SYSTEM FOR SACROILIAC JOINT FUSION

(71) Applicant: NEVRO CORP., Redwood City, CA (US)

(72) Inventors: Michael Black, Phoenixville, PA (US); Damian Heinz, Wayne, PA (US)

(73) Assignee: NEVRO CORP., Redwood City, CA (US)

( * ) Notice: Subject to any disclaimer, the term of this patent is extended or adjusted under 35 U.S.C. 154(b) by 0 days.

(21) Appl. No.: 18/329,231

(22) Filed: Jun. 5, 2023

(65) Prior Publication Data

US 2023/0389974 A1    Dec. 7, 2023

Related U.S. Application Data

(63) Continuation of application No. 15/136,615, filed on Apr. 22, 2016, now abandoned.

(Continued)

(51) Int. Cl.
| | |
|---|---|
| *A61B 17/02* | (2006.01) |
| *A61B 17/16* | (2006.01) |
| *A61B 17/17* | (2006.01) |
| *A61B 17/34* | (2006.01) |
| *A61B 17/92* | (2006.01) |
| *A61F 2/46* | (2006.01) |
| *A61B 17/32* | (2006.01) |
| *A61F 2/30* | (2006.01) |

(52) U.S. Cl.
CPC .......... *A61B 17/92* (2013.01); *A61B 17/025* (2013.01); *A61B 17/1604* (2013.01); *A61B 17/1659* (2013.01); *A61B 17/1671* (2013.01); *A61B 17/17* (2013.01); *A61B 17/3468* (2013.01); *A61B 17/1739* (2013.01); *A61B 17/1757* (2013.01); *A61B 2017/320044* (2013.01); *A61B 2017/346* (2013.01); *A61B 2017/922* (2013.01); *A61F 2002/3093* (2013.01); *A61F 2002/30995* (2013.01); *A61F 2/4603* (2013.01); *A61F 2002/4627* (2013.01); *A61F 2002/4635* (2013.01); *A61F 2002/4687* (2013.01)

(58) Field of Classification Search
CPC .............. A61B 17/1757; A61B 17/025; A61B 2017/346

See application file for complete search history.

(56) References Cited

U.S. PATENT DOCUMENTS

| | | |
|---|---|---|
| 5,242,444 A | 9/1993 | MacMillan |
| 6,053,916 A | 4/2000 | Moore |

(Continued)

*Primary Examiner* — David W Bates

(57) ABSTRACT

A surgical system for preparing the sacroiliac (SI) joint for a fusion, comprising a sliding joint finder and a working cannula. The working cannula comprises a body having a central axis that runs the length of the body. The body of the working cannula comprises a distal end, a proximal end and a central cavity that is positioned along the central axis of the working cannula and has suitable dimensions for sliding the working cannula over the sliding joint finder and the working cannula further comprises two protrusions extending proximally. In addition, the two protrusions have uneven lengths such that when the working cannula is inserted, the longer of the two protrusions engages the SI joint at a superior end of the SI joint and the shorter of the two protrusions engages the SI joint at an inferior end of the SI joint.

20 Claims, 13 Drawing Sheets

Related U.S. Application Data

(60) Provisional application No. 62/151,842, filed on Apr. 23, 2015.

(56) References Cited

U.S. PATENT DOCUMENTS

| | | | |
|---|---|---|---|
| 6,235,059 B1 | 5/2001 | Benezech | |
| 6,682,563 B2 | 1/2004 | Scharf | |
| RE38,614 E | 10/2004 | Paul | |
| RE40,796 E * | 6/2009 | O'Neill | A61B 17/1637 606/179 |
| 8,221,428 B2 | 7/2012 | Trieu | |
| 8,343,189 B2 | 1/2013 | Assell | |
| 8,348,950 B2 | 1/2013 | Assell | |
| 8,808,377 B2 | 8/2014 | Donner | |
| 8,945,227 B2 | 2/2015 | Kirschman | |
| 8,979,928 B2 | 3/2015 | Donner | |
| 9,119,732 B2 | 9/2015 | Schifano | |
| 9,186,155 B2 | 11/2015 | Katzman | |
| 9,351,845 B1 | 5/2016 | Pimenta | |
| 9,883,874 B1 | 2/2018 | Vestgaarden | |
| 10,357,368 B2 | 7/2019 | Aksu | |
| 10,603,187 B2 | 3/2020 | Laubert | |
| 2002/0016592 A1 | 2/2002 | Branch | |
| 2002/0107574 A1 | 8/2002 | Boehm | |
| 2002/0138146 A1 | 9/2002 | Jackson | |
| 2005/0071008 A1 | 3/2005 | Kirschman | |
| 2005/0101960 A1 | 5/2005 | Fiere | |
| 2005/0159813 A1 | 7/2005 | Molz | |
| 2008/0294262 A1 | 11/2008 | Levieux | |
| 2009/0216238 A1 | 8/2009 | Stark | |
| 2009/0326580 A1 | 12/2009 | Anderson | |
| 2010/0268228 A1 | 10/2010 | Petersen | |
| 2011/0060375 A1 | 3/2011 | Bonutti | |
| 2011/0238181 A1 | 9/2011 | Trieu | |
| 2011/0264229 A1 | 10/2011 | Donner | |
| 2012/0022535 A1 | 1/2012 | Mayer | |
| 2012/0095560 A1 | 4/2012 | Donner | |
| 2012/0296428 A1 | 11/2012 | Donner | |
| 2012/0316565 A1 | 12/2012 | Stark | |
| 2013/0035723 A1 | 2/2013 | Donner | |
| 2013/0060337 A1 | 3/2013 | Petersheim | |
| 2014/0012380 A1 | 1/2014 | Laurence | |
| 2014/0039264 A1 | 2/2014 | Heiman | |
| 2014/0088707 A1 | 3/2014 | Donner et al. | |
| 2014/0107786 A1 | 4/2014 | Geisler | |
| 2014/0135927 A1 | 5/2014 | Pavlov | |
| 2014/0200618 A1 | 7/2014 | Donner | |
| 2014/0207240 A1 | 7/2014 | Stoffman | |
| 2014/0228960 A1 | 8/2014 | Forterre | |
| 2014/0277165 A1 * | 9/2014 | Katzman | A61B 17/1671 606/279 |
| 2014/0277204 A1 | 9/2014 | Sandhu | |
| 2014/0277460 A1 | 9/2014 | Schifano | |
| 2015/0073486 A1 | 3/2015 | Marotta | |
| 2015/0073488 A1 | 3/2015 | Rinner | |
| 2015/0112444 A1 | 4/2015 | Aksu | |
| 2015/0173805 A1 | 6/2015 | Donner | |
| 2015/0182268 A1 | 7/2015 | Donner | |
| 2015/0209087 A1 | 7/2015 | Donner | |
| 2015/0250612 A1 | 9/2015 | Schifano | |
| 2015/0335372 A1 | 11/2015 | Schifano | |
| 2016/0058480 A1 | 3/2016 | Laubert | |
| 2016/0175113 A1 | 6/2016 | Lins | |
| 2016/0235546 A1 | 8/2016 | Cheng | |
| 2016/0367379 A1 | 12/2016 | Refai | |
| 2019/0336292 A1 | 11/2019 | Aksu | |
| 2020/0155324 A1 | 5/2020 | Sazy | |
| 2020/0281736 A1 | 9/2020 | Milz | |
| 2021/0045892 A1 | 2/2021 | Rogers | |
| 2021/0322181 A1 | 10/2021 | Predick | |

* cited by examiner

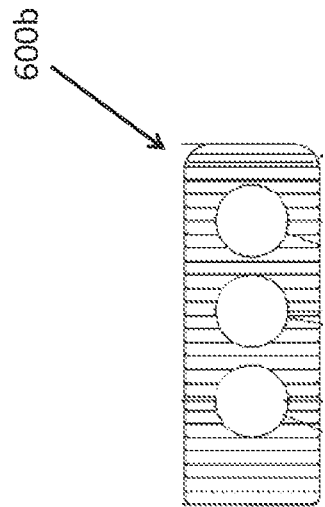
FIG. 6A
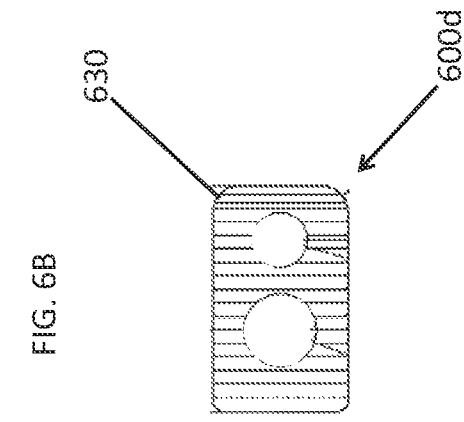
FIG. 6B
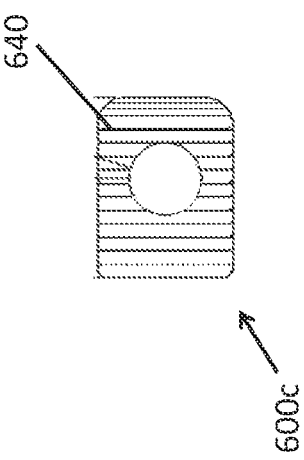
FIG. 6C
FIG. 6D

SYSTEM FOR SACROILIAC JOINT FUSION

CROSS-REFERENCE TO RELATED APPLICATION

This application is a continuation of U.S. application Ser. No. 15/136,615, filed Apr. 22, 2016, which claims priority to U.S. Provisional Appl. No. 62/151,842, filed Apr. 23, 2015. The disclosure of each application listed above is incorporated herein by reference in its entirety.

FIELD OF THE INVENTION

The present invention relates generally to surgical procedures for a sacroiliac (SI) joint, and more specifically, to systems for guiding and delivering SI joint implants in place.

BACKGROUND OF THE INVENTION

Sacroiliac (SI) joints are located between the sacrum and the right and the left iliac bones, respectively. The sacrum is a triangular bone in the lower back formed from fused vertebrae and situated between the two hipbones of the pelvis. The ilium is the largest and uppermost bone of the pelvis.

The SI joints provide support for the entire weight of the upper body when a human stands erect, which creates a large amount of stress on the SI joints. Therefore, these joints are susceptible to injury and degeneration. Acute and chronic injury, degeneration, and laxity of the supporting ligaments of the SI joint can result in low back and radiating buttock and leg pain in afflicted patients. Stabilization or immobilization (fixation) of the SI joint is commonly advocated as a surgical treatment for many SI joint disorders.

A significant problem with certain conventional methods for SI joint fixation is that they require a surgeon to have direct access and a view of the SI joint. Thus, some conventional SI joint fixation techniques require the use of what is commonly referred to as "open surgery," and result in significant trauma and disruption to the tissues and skin surrounding the SI joint. Open procedures increase the risk of damage to major nerves, blood vessels, ligaments, and muscles around the incision site. Moreover, open procedures increase operative, hospitalization, and recovery time due to the extensive soft tissue damage resulting from open surgery techniques.

In response to the problems related to open surgery for SI joint fixation, minimally invasive surgical (MIS) procedures were developed. Currently, one of two approaches is taken to access the SI joint for fixation procedures: a lateral approach and a posterior approach. In conventional MIS procedures employing the lateral approach, screws, rods, or other fixation devices are passed through a small incision (as compared to that in open surgery) made on the lateral hip and inserted laterally through the ilium, across the SI joint space, and into the sacrum. See, e.g. U.S. Pat. No. 8,221,428 by Trieu.

Alternatively, a posterior approach may be used to access the SI joint for delivery of SI joint implants. See, e.g. U.S. Publication No. 2012/0316565 by Stark and U.S. Publication No. 2013/0035723 by Donner. In the posterior approach disclosed by Stark and Donner a small (as compared to that in open surgery) incision made in the patient's back, and the SI joint is accessed through an extra-articular recess located between the sacrum and the ilium.

Although the points of incision are different in current MIS procedures for accessing the SI joint, neither is truly minimally invasive. Conventional lateral MIS procedures still may result in significant trauma to the major nerves, blood vessels, and muscle groups of the hip. While current posterior MIS approaches eliminate damage to the soft tissues and neurovascular system of the lateral hip, they still carry a significant risk of trauma to the spinal nerves and major back and hip ligaments.

There exists a need for improved MIS systems and procedures that are less invasive and decrease soft tissue trauma and the risk to neurovascular tissue during SI joint fixation procedures.

Therefore, it is an object of the invention to provide an improved, less invasive system and method for stabilizing an SI joint.

SUMMARY OF THE INVENTION

A system and method for preparing the sacroiliac (SI) joint and delivering an implant to the SI joint is described herein. In the methods, the SI joint is accessed using a sliding joint finder and a working cannula, which are inserted into the space via an inferior inlet approach. In some embodiments, the method includes inserting an implant into the joint space. In these embodiments, the system includes an implant insertion tool. The system and method provide a less invasive and safer approach for repairing and/or stabilizing an SI joint than currently available methods.

Preferably, a sliding joint finder is inserted into the joint, followed by insertion of a working cannula. The working cannula is configured to fit over the sliding joint finder, allowing subsequent removal of the sliding joint finder, and provides a hollow cavity for joint fusion preparation, decortication and insertion of an implant. Optionally, various excavation tools, drill guides and implant insertion tools are configured for insertion into the working cannula. After the SI joint space is prepared, an implant may be inserted into the prepared SI joint.

BRIEF DESCRIPTION OF THE DRAWINGS

As shown in FIG. 3A, optionally a lateral guide boom (300) can be inserted into the lateral slot (280). The proximal end (240) of the working cannula has two protrusions (242a and 242b) containing sharp edges (250a and 250b). One protrusion is located on the superior side of the cannula and the other is located on the inferior side of the cannula. The side (228) of the working cannula shown in FIG. 3A is marked (226a) to indicate that it should face the ilium. This side of the working cannula contains a unilateral shelf (260), which is located proximal to the two protrusions and, optionally, contains one or more holes or slots (224, 232a, 232b). The lateral guide boom has a curved L shape, the proximal end of which ends in a substantially rectangular paddle-like structure (320) with one, two, or more holes (310a, 310b, 310c).

FIG. 5B shows the insertion end without an implant. FIG. 5C shows the insertion end with an implant enclosed therein. The insertion end (510) captures and encapsulates the implant (600). The insertion end (510) contains a rectangular cavity (512), into which the implant fits, and a tab (515). A slidable insert ram (560), which is in slidable relation to the central cavity of the body, is configured to push the implant out of the insertion end.

FIGS. 6A-6D show exemplary allograft implants of various sizes (600a, 600b, 600c, 600d). The implant may have one or a plurality of holes (610, 620) of various sizes along its length, allowing for insertion of bone graft. The corners of the implant are rounded (630) and the upper and lower sides of the implant have triangular projections (640).

DETAILED DESCRIPTION OF THE INVENTION

I. Definitions

Figure 1:
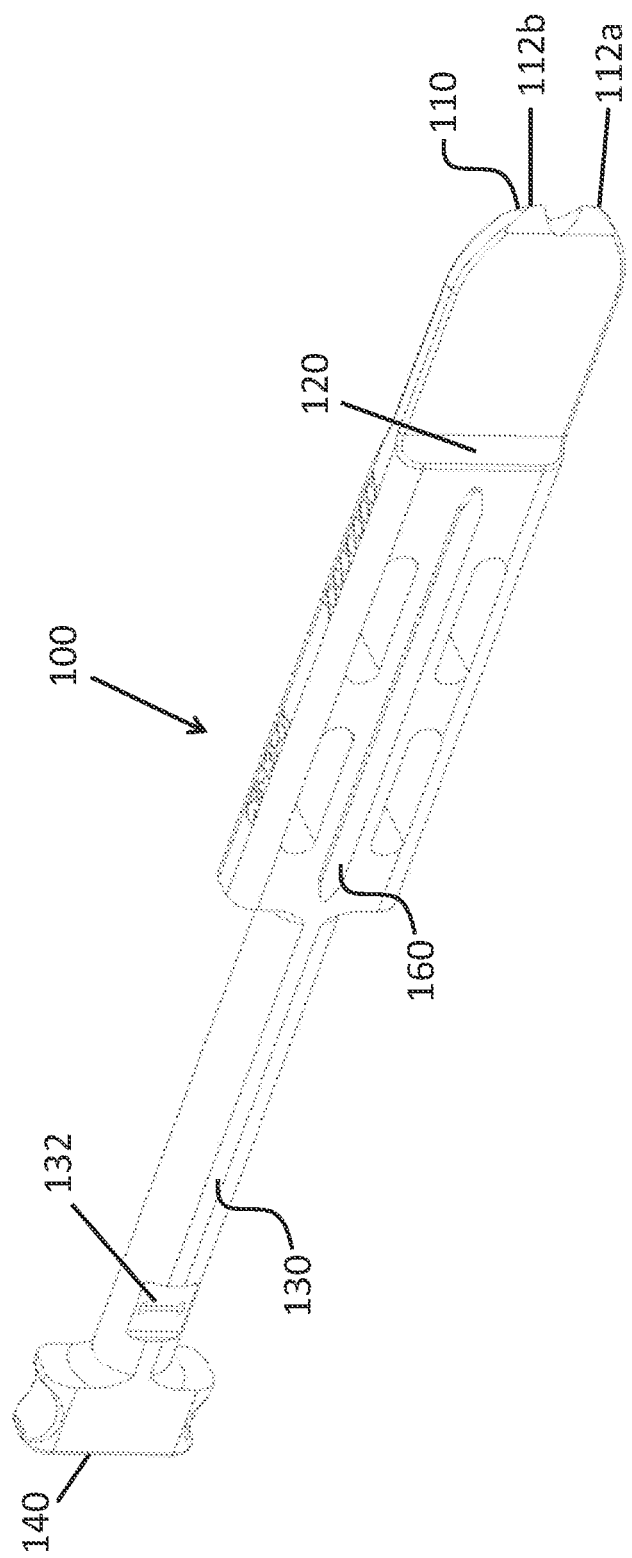
FIG. 1 shows an exemplary sliding joint finder (100) including two large frontal radii (110a and 110b) and a unilateral shelf (120). The side displayed is labeled (130) to indicate that it should be inserted facing the ilium. The distal end (140) has an expanded surface area.

As used herein, the term "align" refers to the arrangement of two or three, or more objects so that they form a substantially straight line.

As used herein, the term "allograft" refers to a transplant of tissue, typically with reference to bone, from one individual to another of the same species.

As used herein, the term "cavity" refers to an empty space within a solid object, such as an empty space in a tool, or in the human body.

As used herein, the term "decortication" refers to the removal of tissue in preparation for placement of an implant.

As used herein, the term "distal" refers to being situated away from the center of the body or from the point of attachment.

As used herein, the term "lateral" refers to of, at, toward, or from the side or sides.

As used herein, the term "protrusion" refers to an object that sticks out from another, such as a bump, lump, knob, ledge, or other projection.

As used herein, the term "proximal" refers to being situated nearer to the center of the body or the point of attachment.

As used herein, the term "shelf" refers to a protruding ledge.

As used herein, the term "slot" refers to a long, narrow aperture or slit.

As used herein, the term "superior" refers to the upper surface of a structure (as opposed to the lower surface).

As used herein, the term "unilateral" refers to being situated or positioned on one side of an object.

II. System

A system for guiding a joint implant system into place in a minimally invasive manner, related components, and exemplary methods of employing the implant system are described herein. In a preferred embodiment, the system is employed to guide a sacroiliac (SI) joint implant into place.

The system includes a sliding joint finder and a working cannula. In some embodiments, the system also includes an implant insertion tool. Optionally, additional components, such as specific implants, implant insertion tools, joint box chisels, joint rasps, and K-Wires are used in or with the system. The various components of the SI implant system are fabricated from biocompatible materials suitable for insertion in a human body, including but not limited to, metals, synthetic polymers, ceramics, and/or their combinations, depending on the particular application and/or preference of a medical practitioner. Further, the components of the implant system can be manufactured via various methods, such as by injection-molding, insert-molding, co-extrusion, pultrusion, transfer molding, overmolding, compression molding, 3-Dimensional printing, dip-coating, spray-coating, powder-coating, porous-coating, milling from a solid stock material and their combinations.

A. Sliding Joint Finder

The sliding joint finder has a hollow central region that runs down the central axis of its body. The width of the proximal end of the sliding joint finder is configured for it to fit directly into the SI joint. Optionally, the proximal end of the sliding joint finder also contains large frontal radii to deflect and dilate tissue encountered during insertion. The body of the sliding joint finder has two distinct sides, one side is configured for placement adjacent to the sacrum and the opposite side is configured for placement adjacent to the ilium. Preferably each side is labeled to distinguish one side from the other. Typically, the side that is configured to be placed adjacent to the ilium contains a shelf located adjacent to the proximal end at a suitable length to contact the ilium and prevent over insertion of the sliding joint finder. The shelf is adjacent to first end of each of the protrusions.

Figure 2:
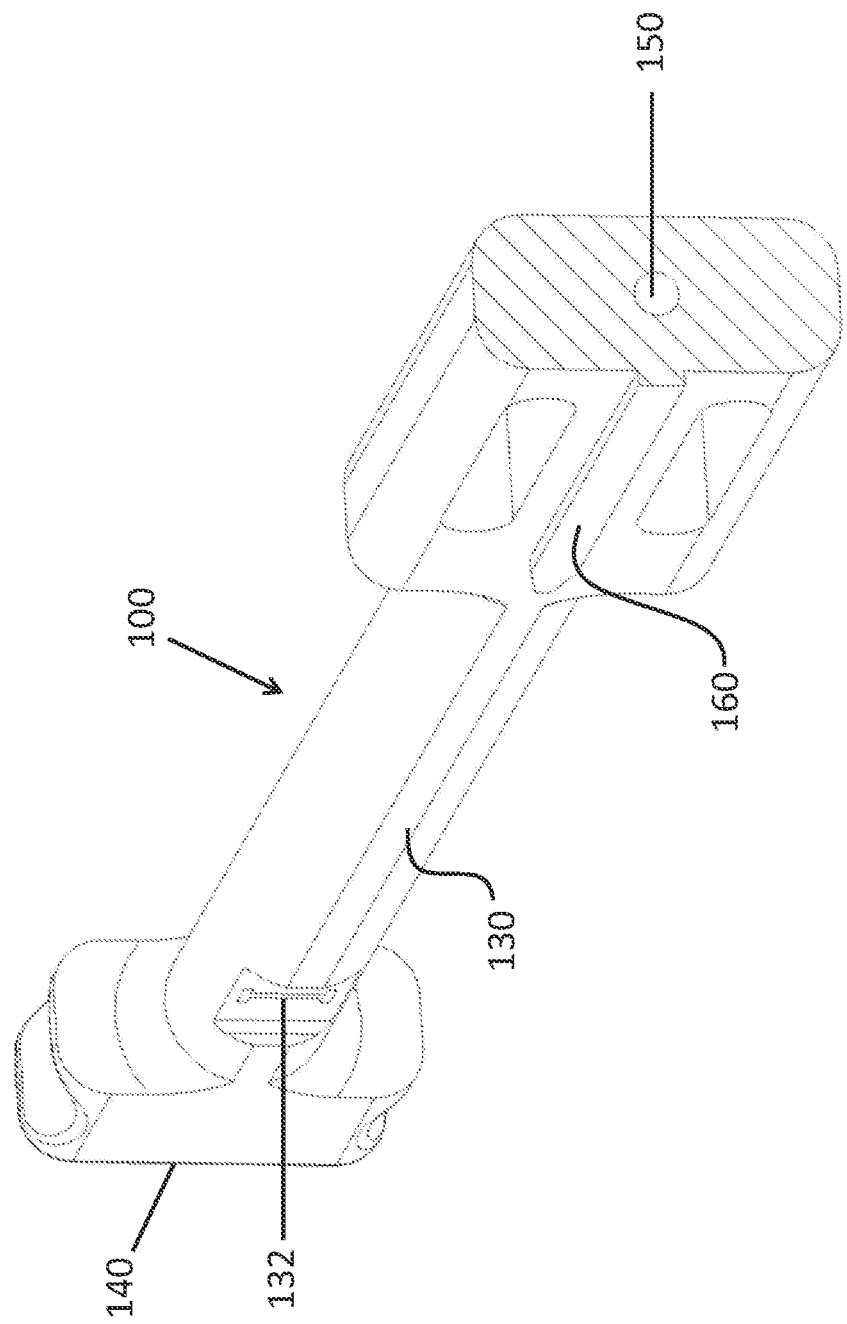
FIG. 2 is a cross-sectional perspective view of the distal half of an exemplary sliding joint finder (100). The side displayed is labeled (130) to indicate that it should be inserted facing the ilium. The distal end (140) has an expanded surface area. Also shown is a hole (150) running down the central axis, allowing the sliding joint finder to slide over a pin or wire, such as Kirschner wire (K-Wire), and for the pin or wire to be removed.

Referring to FIGS. 1 and 2, the sliding joint finder (100) is generally rectangular in its cross sectional shape, with the height being about twice that of the width. While the Figures illustrate a generally rectangular-shaped sliding joint finder, the sliding joint finder can have any other shape that allows it to fit inside the working cannula. It has a hole (150) that runs down the central axis to allowing the sliding joint finder to slide over a pin or wire, such as a Kirschner Wire (K-Wire), and for the pin or wire to be removed through the sliding joint finder from the patient's body. The width of the leading end (110) of the sliding joint finder allows it to fit directly into the SI joint. In certain embodiments the leading edge (110) has large frontal radii (112a, 112b) that are approximately equal to the height of the sliding joint finder, to deflect and dilate tissue encountered during insertion.

Preferably, the sliding joint finder has two distinct sides (one side, 130, is shown in FIG. 1, the other side is opposite it), one configured to face the sacrum and the other configured to face the ilium, preferably each side is labeled (132) to distinguish it from the other side. In some embodiments a shelf (120) is located on one of these sides to control the depth of insertion into the joint.

The unilateral shelf (120) is located at a suitable distance along one side (130) of the sliding joint finder to control the depth of insertion into the joint, by contacting the edge of the posterior inferior iliac spine. The unilateral shelf also establishes two distinct sides of the sliding joint finder, so that when inserted into the joint, one side of the sliding joint finder faces the sacrum, while the other side faces the ilium. The side that contains the unilateral shelf corresponds with the side that should be adjacent to the ilium when the sliding joint finder is inserted into the joint. The sliding joint finder is optionally labeled on at least one side, optionally on both sides, to help a user distinguish the two sides, for example, one side can be labeled "S" for "sacrum", the other "I" (132) for "ilium".

The sliding joint finder also has a long rail (160) running down its length, which can serve as a guide for other tools, such as the working cannula to ensure that they are placed at the desired site and in the desired orientation in the patient's body.

In some embodiments the sliding joint finder has holes or slots on its sides which serve to reduce the weight of the instrument and facilitate cleaning. In some embodiments the distal end (140) of the sliding joint finder has an expanded surface area, providing a larger surface for impaction, if needed, such as by hitting the distal end with a mallet.

B. Working Cannula

Figure 3A:
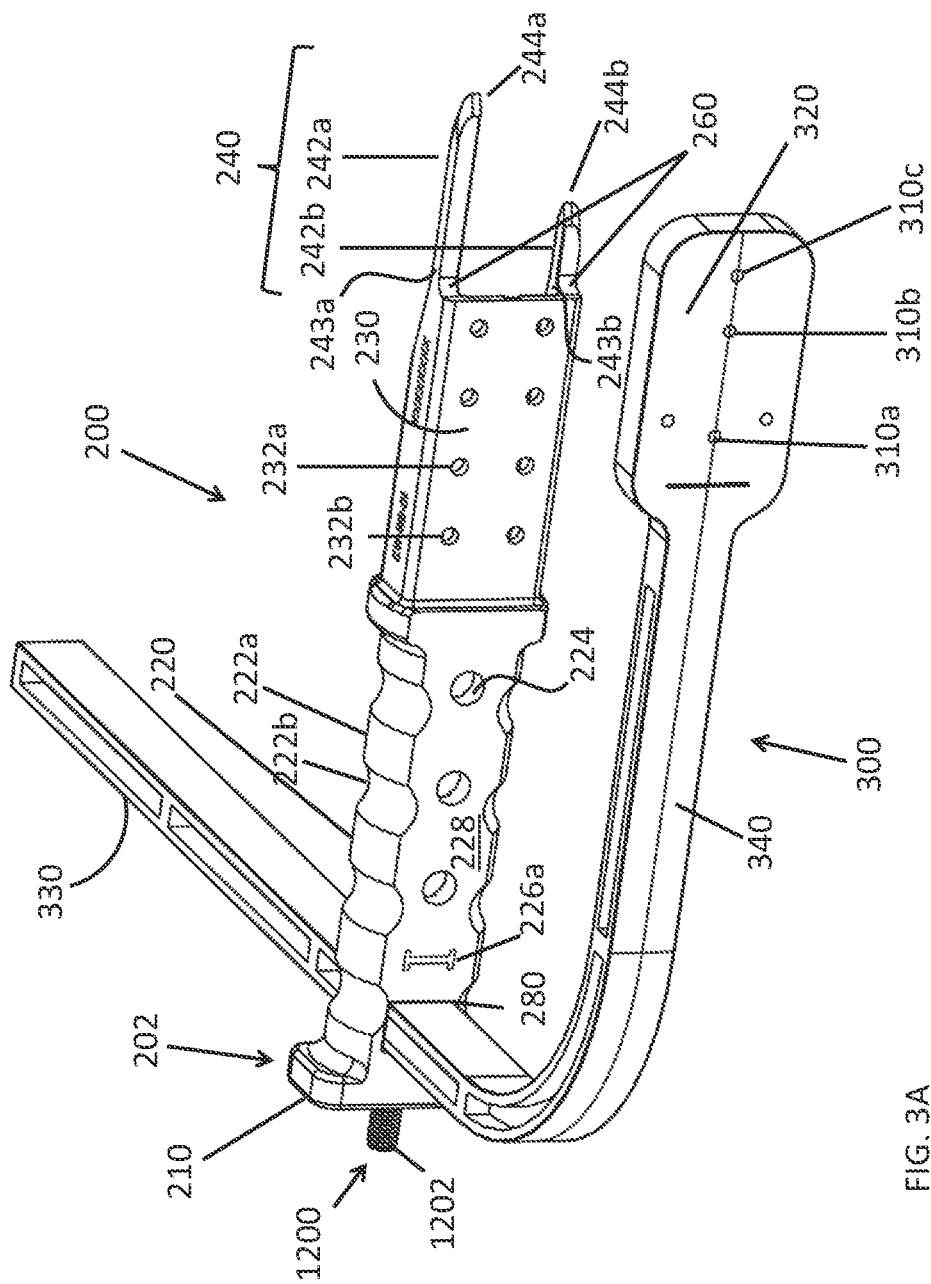
FIG. 3A is a side view of an exemplary working cannula (200) with a lateral slot (280) located in the handle portion (220) near the distal end (210) of the working cannula.
Figure 3B:
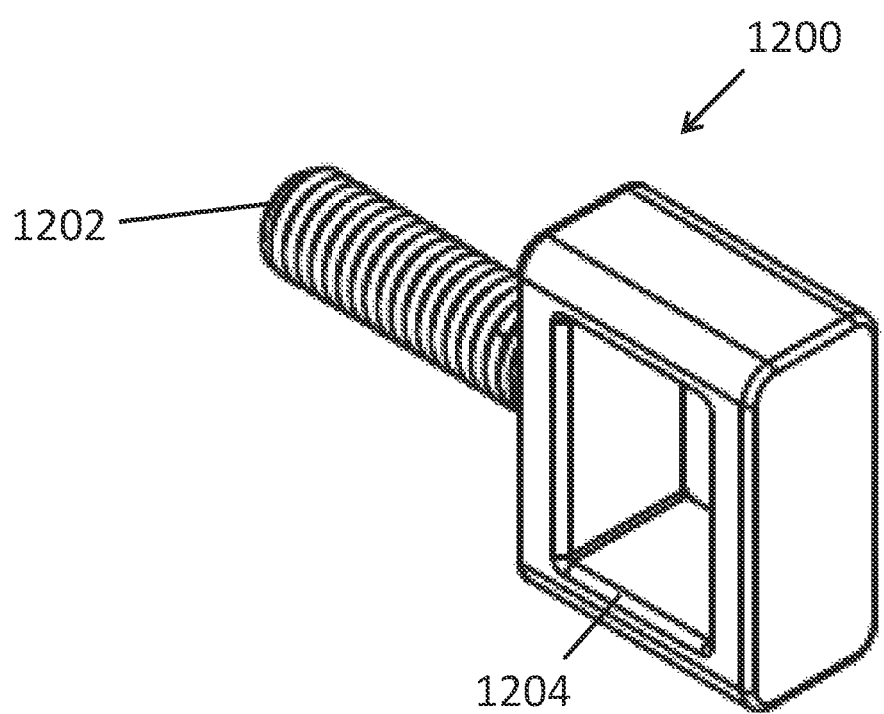
FIG. 3B shows a lateral guide clamp (1200), which fits into the distal end of the working cannula.
Figure 4:
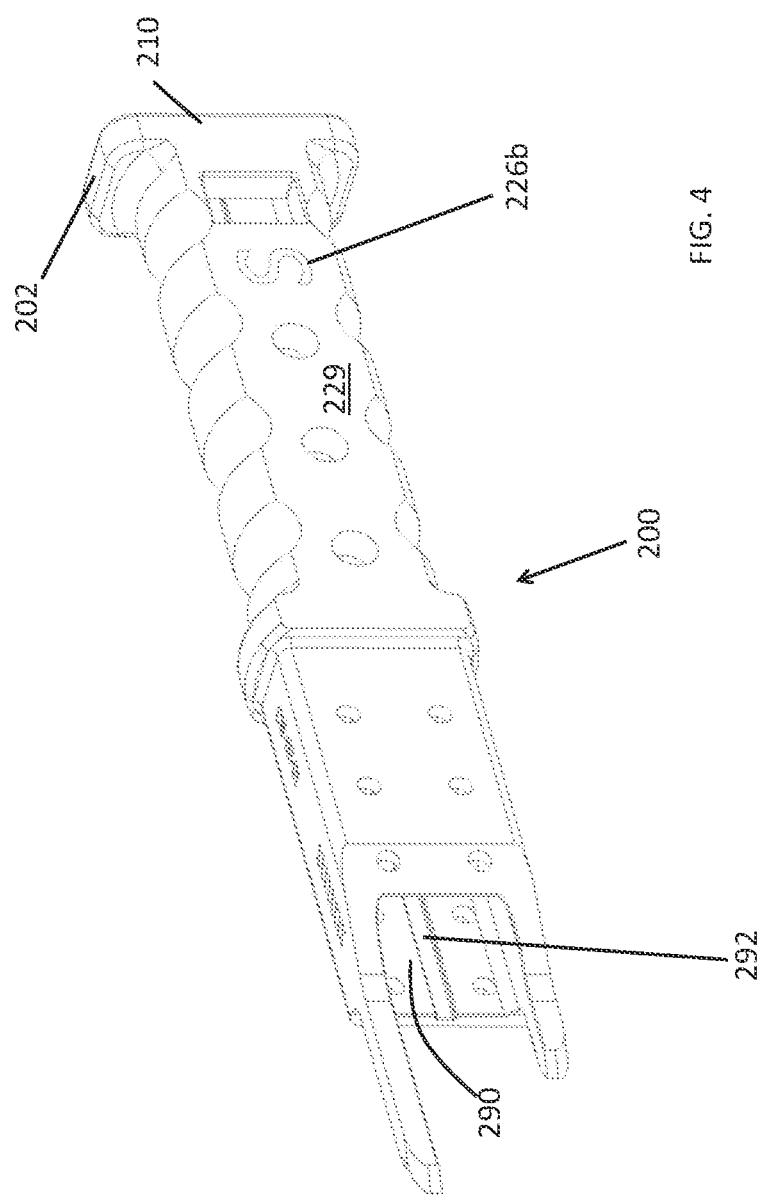
FIG. 4 is a partial cross-sectional perspective view of an exemplary working cannula (200). The side shown is labeled (226b) to face the sacrum. Also shown is a long rectangular slot (292) running down its length.

The working cannula is an instrument that has a suitable height and width for insertion into the SI Joint and to interact with the other tools in the system. The working cannula contains a cavity, which runs down the central axis. The cavity provides a working space through which other tools in the system are inserted and within which the other tools are used to prepare the SI Joint, or insert the implant into the SI Joint. Typically, the height of the working cannula is about twice that of its width. Preferably the lateral walls of the cavity are substantially straight. The top and bottom portions of the cavity may be straight or curved. As shown in FIGS. 3A, 3B and 4, the working cannula may have a rectangular shaped cavity. This is particularly useful for inserting implants that are generally rectangular in shape. However, the cavity of the working cannula can have any suitable shape and size that allows the tools to fit inside of it, and optionally, an implant, such as a spacer, to be inserted through it. As shown in the Figures, the tools that are used with the working cannula have a suitable shape and size to fit in the working cannula. The tools described herein can be modified to have any suitable shape that fits in the correspondingly shaped cavity of the working cannula.

The proximal end of the working cannula contains two protrusions, which terminate in sharp edges. When the working cannula is inserted into the SI Joint, the sharp edges of the protrusions of the working cannula hold the joint open and retain the working cannula in position.

An exemplary working cannula is illustrated in FIGS. 3A and 4. Referring to FIG. 3A, the working cannula (200) has a generally rectangular shaped body having a central axis that runs the length of the body. The cannula body has a distal end (210), a proximal end (240) and a substantially rectangular cavity (290) that is runs along the central axis. The cannula also contains a handle portion (220) and an insertion portion (230). Optionally, the distal end (210) of the handle portion is configured to receive a lateral guide clamp (1200) as illustrated in FIGS. 3A and 3B. The lateral guide clamp contains a slot (1204) which is sized to receive instrument for guiding fixation elements, such as a lateral guide boom (300), via lateral insertion into the slot. A fastening device such as a nut can be screwed onto the distal end (1202) of the lateral guide clamp to secure the lateral guide boom to the handle portion of the working cannula.

Figure 10:
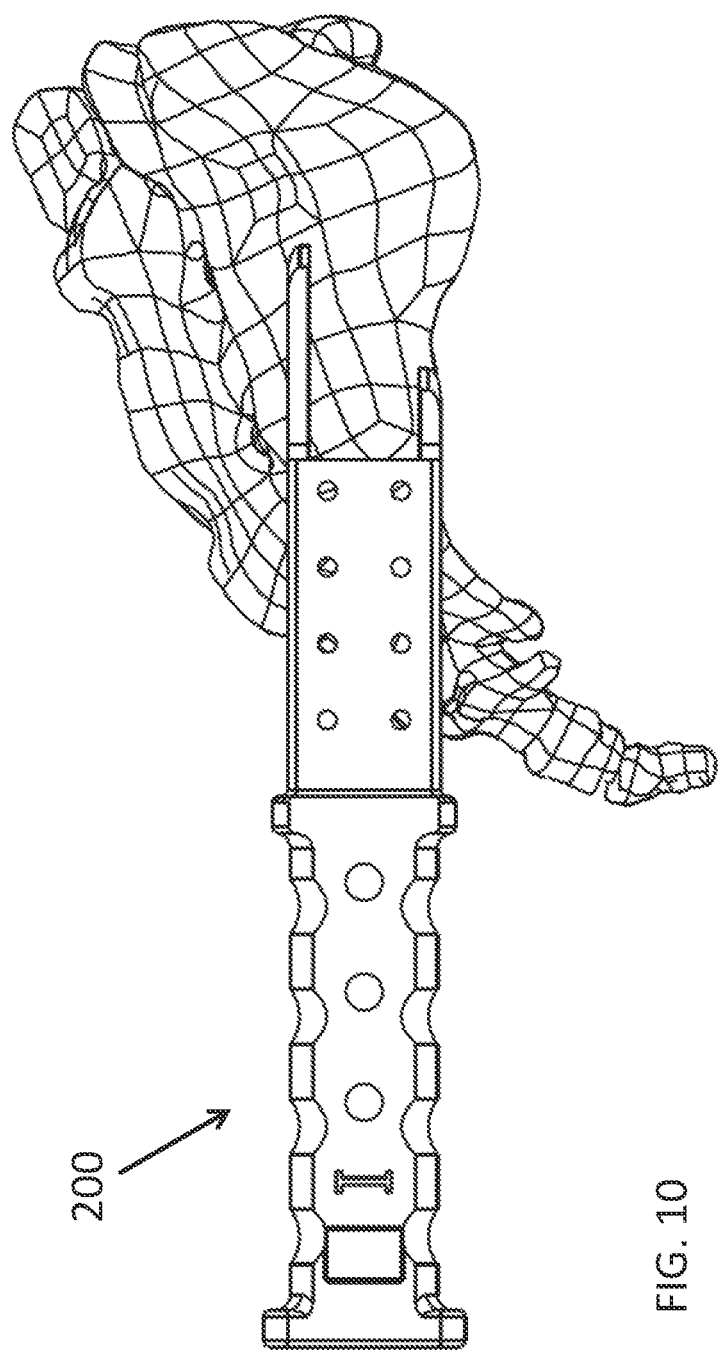
FIG. 10 shows a view of an exemplary working cannula (200) inserted into the SI joint.

The proximal end (240) of the working cannula terminates at the second ends (244a, 244b) of the two protrusions (242a and 242b), where the protrusions have different lengths. The distance between the two protrusions is selected so that the protrusions fit directly into the SI joint (FIG. 10). The distance between the protrusions is selected to allow insertion of an implant, such as a spacer, directly between them. In a preferred embodiment, the protrusions allow insertion of an implant that has a height of 15 mm. The second ends (244a, 244b) of the protrusions typically have sharp, pointy edges that deflect and dilate any tissues they encounter during insertion.

When the working cannula is correctly oriented within a patient, the longer protrusion 242a is located at the superior side and shorter protrusion 242b at the inferior side of the SI joint, thus preventing insertion of the cannula through the joint (see FIG. 10). In a preferred embodiment, the working cannula has a shelf (260) on one side, which controls the depth of insertion into the joint. In these embodiments, the proximal end (240) of the working cannula begins at the location of the shelf (260) and terminates at the second ends (244a, 244b) of the protrusions (242a and 242b). Typically the shelf (260) is on the side (228) of the working cannula that should be located adjacent to the ilium, and is positioned adjacent to the first end (243a, 243b) of each of the protrusions. The distance from the longest protrusion (240a) to the shelf is typically about 35 mm. The distance from the shortest protrusion (240b) to the shelf is typically about 15 mm.

Referring to both FIGS. 3A and 4, the working cannula has two distinct sides, a first side (228) configured to face the ilium and the second, opposite side (229), configured to face the sacrum. In a preferred embodiment, at least one of the side, and optionally each of the sides is marked (226a and 226b) to identify whether it should contact the sacrum (as shown in FIG. 4, marked with "S") or the ilium (as shown in FIG. 3A, marked with "I"). These markings are merely illustrative and it is understandable that other markings may be included to distinguish one side from the other.

The cavity (290) defines a working space into which other tools in the system are placed and used to prepare the SI joint and/or stabilize the joint, optionally using an implant. Preferably, at least one wall inside the cavity (290) contains a long slot (292) running down its length to act as a guide for other tools. Tools that are inserted into the working cannula preferably contain a rail along an outside surface of the tool, which runs the length of the body of the tool, where the rail is configured to align with the slot on the working cannula. This allows the tool to slide along the rail and remain in the appropriate position within the cavity.

The cavity has a suitable size and shape to retain an implant, such as a spacer. In some preferred embodiments, the cavity is rectangular in shape to accommodate and retain a rectangular shaped spacer. Other sized cavities are envisioned to accommodate larger, longer, or smaller implants, or implants with different shapes.

In some embodiments, the working cannula has holes or slots (224, 232a, 232b) along its insertion portion, handle portion, or both, which serve to reduce its weight and facilitate cleaning. Typically the insertion portion is slightly smaller than the handle portion.

In some embodiments, the handle portion (220) is typically rounded, at least on its superior and inferior surfaces with a plurality of ridges (222a, 222b) giving the operator a solid grip of the instrument. The handle portion terminates at the distal end (210). The distal end (210) of the working cannula has a larger, flat surface area due to a flange (202) that protrudes, making the distal end wider than the rest of the handle portion (220). The larger surface area of the distal end allows a user to more easily impact the end of the working cannula, if needed, such as with a mallet.

Optionally, the handle portion of the working cannula is configured to allow a tool to be mounted onto it to guide the insertion of fixation elements. For example, the handle portion may contain a slot (280), which is sized to receive a guide instrument and secure the guide instrument to the handle. An exemplary guide instrument is a lateral guide boom (300). The guide instrument can be inserted via lateral insertion into the slot. The slot runs from a first side (228) to a second side (229) of the handle portion. The slot (280) may be located proximal to the flange (202).

C. SI Implant Insertion Tool

In some embodiments, the system includes an implant insertion tool. Typically fixation of the SI joint requires the use of a particular type of implant, i.e. a spacer to ensure the appropriate spacing between the sacrum and the ilium during bone growth and fusion. Preferably the system includes an implant insertion tool, which can be used to hold an appropriately sized spacer while impacting it into the prepared SI joint. While the insertion tool can be used with any spacer formed from any suitable material, the insertion tool is particularly useful for allograft spacers. The insertion tool is able to insert the spacer and impact it into the SI joint without the use of tapped holes or similar high-stress areas, which could overload the fragile material of an allograft spacer.

Figure 5A:
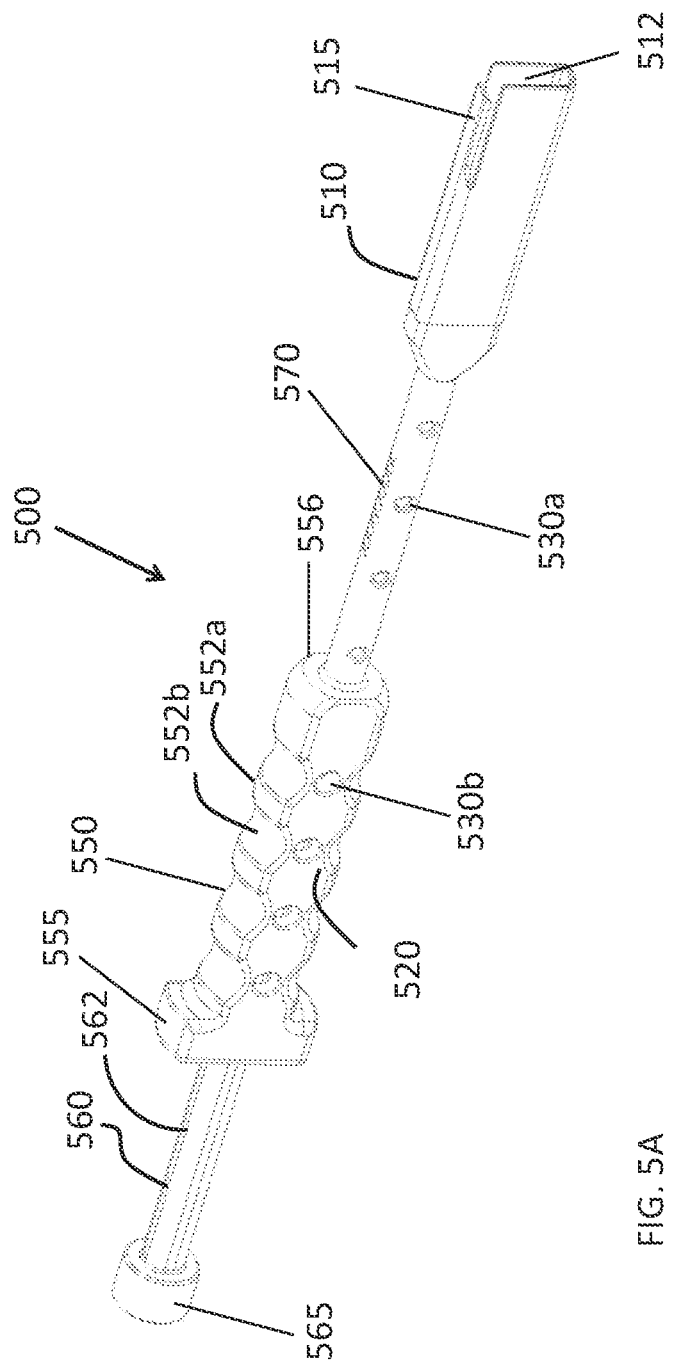
FIGS. 5A-5C show a side view (FIG. 5A) and two cross sectional views (FIGS. 5B and 5C) of an exemplary implant insertion tool (500).
Figure 5B:
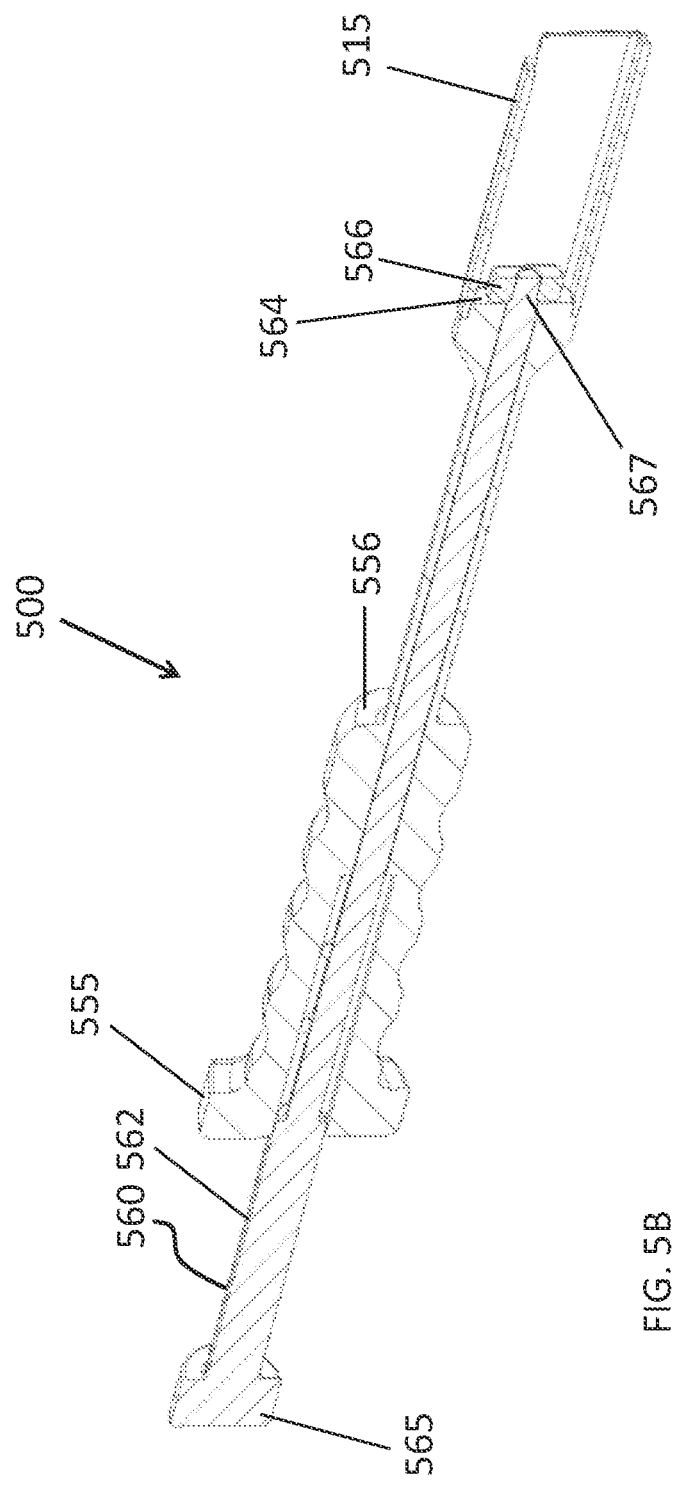

FIG. 5A is a schematic of an exemplary implant insertion tool. FIG. 5B shows a cross-sectional view of the same tool. Referring to FIGS. 5A and 5B, the implant insertion tool (500) has a hollow body with width and height suitable for insertion into the working cannula and removal therefrom. The insertion tool is designed to hold implants of up to 50 mm in length. Its length is directly dependent on the length of the working cannula and is selected so that the proximal end is even with the end of the working cannula, giving the surgeon control of the depth of implant insertion.

The insertion tool (500) contains two main parts: a body (520) and a slidable insertion ram (560). The body (520) has a proximal insertion end (510), a handling region (550), a distal end (555), and a central cavity that runs along a central axis of the body.

The handling region preferably contains a plurality of ridges (552a, 552b), at least along its superior and inferior surfaces, giving the operator a solid grip of the instrument. The handling region terminates at the distal end (555) and its proximal end (556). The proximal end (556) is adjacent to the inserting region (570), which is configured to fit in the insertion portion (230) of the working cannula. The handling region is wider than the insertion portion (230), thus the proximal end (556) of the handling region acts as a stop to prevent over insertion of the implant insertion tool within the working cannula.

Figure 5C:
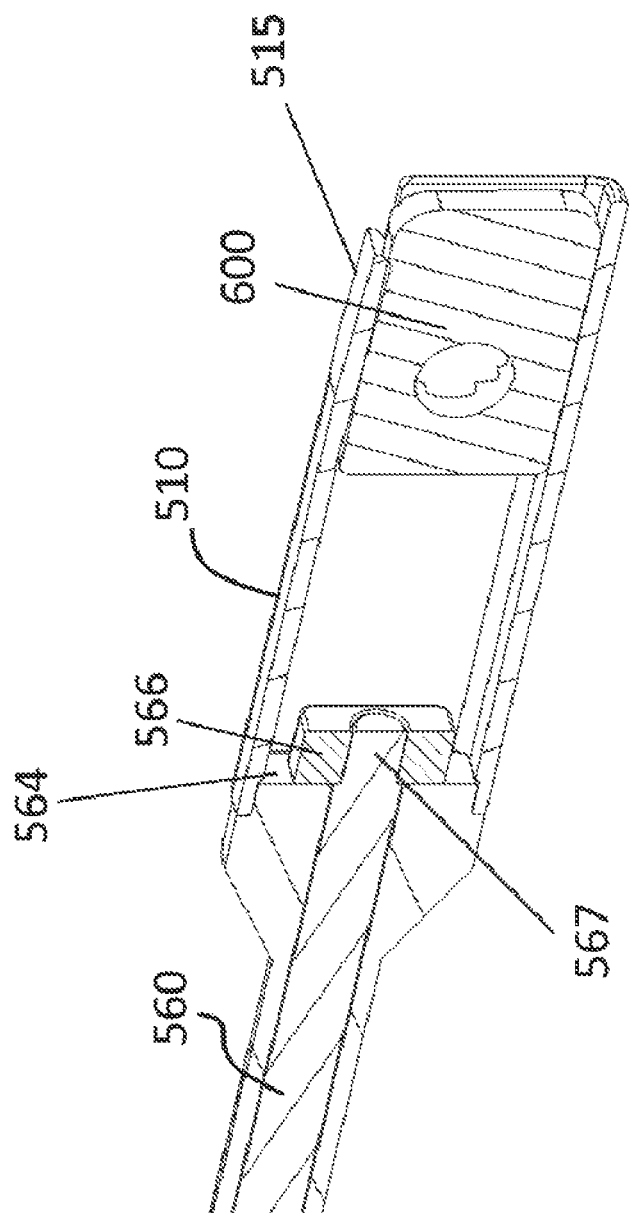

The insertion end (510) contains a cavity (512) with suitable dimensions to retain an implant during insertion. A flexible, thin tab (515) is located on the superior surface of the insertion end (510) and is configured to firmly capture the implant in the tool by friction until pressed out by the slidable ram. The tab is formed from a flexible material, such as stainless steel, which allows the tab to be bent slightly to contact the edge of the spacer, thereby holding the spacer in the cavity with friction. FIG. 5B shows the insertion end without an implant. FIG. 5C shows the insertion end with an implant retained therein.

One or more holes and/or slots (530a, 530b) may be included along the sides of the body to reduce weight and facilitate cleaning of the tool.

The slidable insertion ram (560) contains a distal end with a cap (565) and a long body portion (562) that terminates in a proximal end (564). The long body portion (562) is capable of being fully contained inside the insertion tool in slidable relation to the central cavity of the body. The slidable insertion ram is configured to push the implant out of the insertion end and into the joint. The proximal end (564) terminates in a surface (566), which has a greater surface area than the tip (567) of the proximal end of the body portion (562) to distribute the implant load evenly over the posterior surface of the implant. Typically, the surface (566) has a substantially rectangular shape.

The distal end of the slidable insertion ram (560) typically has a large cylindrical cap (565) suitable for impacting with a mallet.

The slidable insertion ram slides from a retracted position, where the cap is farthest from the distal end (555) of the body (520) to an operative position, where the cap is adjacent to the distal end of the body and the body portion (562) is fully contained within the body (520) of the insertion tool. When the slidable ram is in the operative position, the implant is pushed out of the insertion end of the tool and into the SI Joint In preferred embodiments, the system also includes one or more tools for preparing the SI Joint. Suitable tools include but are not limited to a drill guide, a box chisel, and a rasp. One or more of these tools may be used to prepare the SI Joint.

D. Drill Guide

In a preferred embodiment, the system includes a drill guide. The drill guide is configured to fit within the cavity in the working cannula. The drill guide contains at least two holes that run the length of the guide. The holes are of a suitable size for a standard drill bit, and are based on the width of the implant. In a preferred embodiment, the implant is 6 mm wide.

Figure 9:
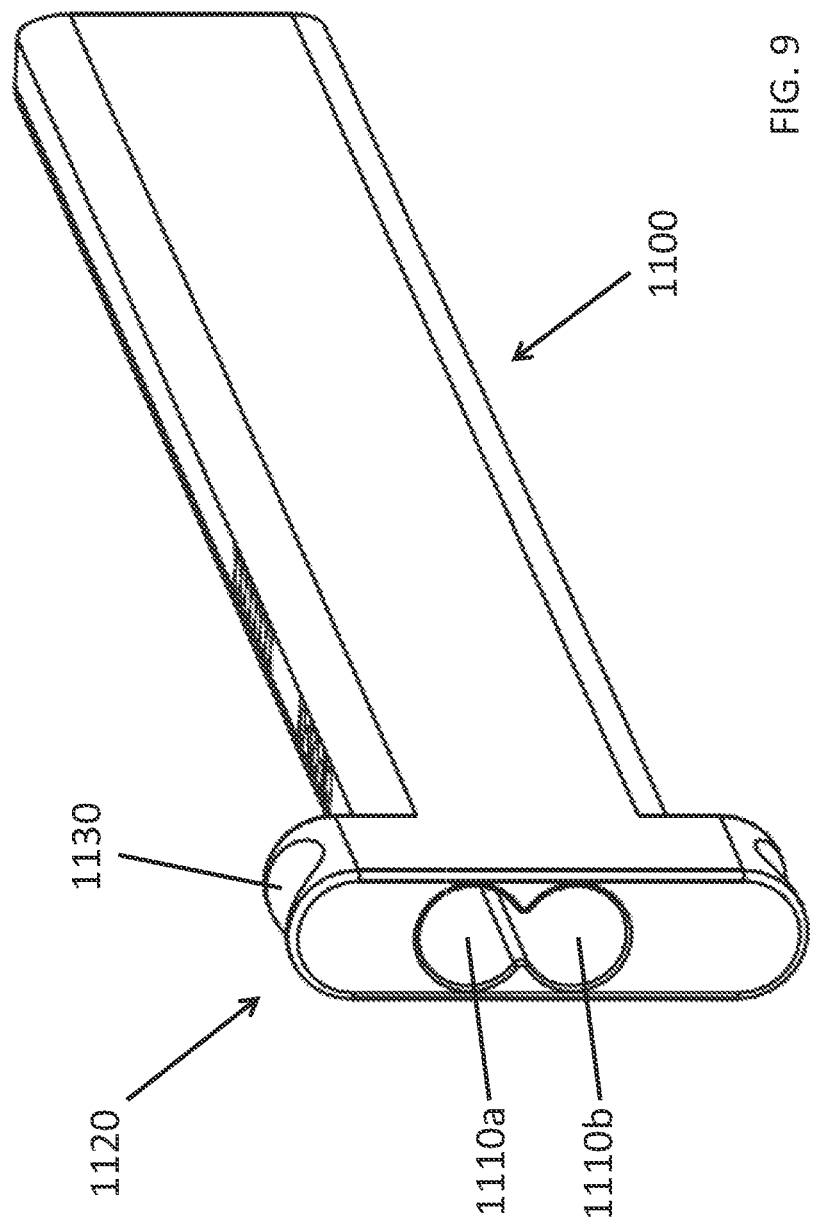
FIG. 9 shows a view of an exemplary drill guide (1100).

Referring to FIG. 9, the drill guide (1100) is a long substantially flat rectangular tool, with two overlapping holes (110a, 1110b) that are joined together and run the length of the drill guide. Each hole has a diameter that is slightly larger than the diameter of the drill being used. At the distal end (1120), the drill guide contains a flange (1130) configured to rest on the distal end (210) of the working cannula.

E. SI Joint Box Chisel

Figure 7:
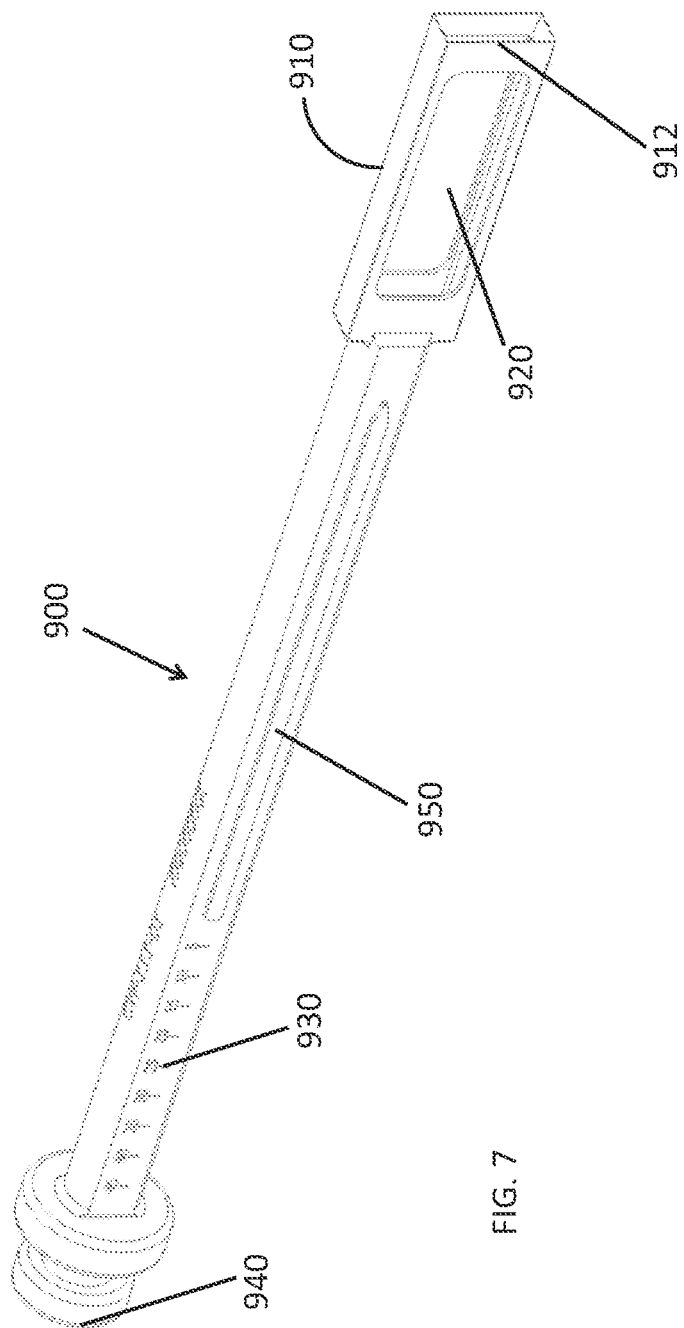
FIG. 7 shows a side view of an exemplary joint box chisel (900), with a sharp rectangular cutting edge (912), a long, box-shaped cavity (920), lateral markings (930) facilitating control of cutting depth, and a cylindrical head (940).

Optionally, the system includes a box chisel. Any suitable box chisel that fits inside the working cannula can be used to prepare the SI Joint. Referring to FIG. 7, the box chisel (900) has a height and width based on the size of the implant and allows insertion of the implant with minimal force but also prevents breakage during insertion. The box chisel contains a sharp rectangular cutting edge (912) at its proximal end (910). Typically, the box chisel contains a box-shaped cavity (920) with one or more slots or windows to collect and remove bone fragments from the chisel. The box chisel preferably contains a long rail (950) running down the length of its body, located on its outer surface that acts as a guide within the working cannula. The rail is configured to fit inside the long slot (292) located on a wall of the cavity (290) of the working cannula, allowing the box chisel to slide up and down along the slot.

Preferably, the box chisel contains a plurality of graduated markings (930) etched on its side which correspond to the depth at which the proximal end is located, which, when aligned with the distal end of the working cannula, gives a surgeon control over the cutting depth.

The box chisel terminates at its distal end (940). The distal end of the box chisel is preferably configured for attachment to other tools to aid in inserting or removing the box chisel from the site. For example, the distal end of the box chisel may be configured to attach to a slap handle for insertion or removal of the tool.

F. SI Joint Rasp

Optionally, the system includes an SI Joint rasp. Any suitable rasp that fits inside the working cannula can be used to prepare the SI Joint. The joint rasp has suitable dimensions to fit in and operate inside the working cannula.

Figure 8:
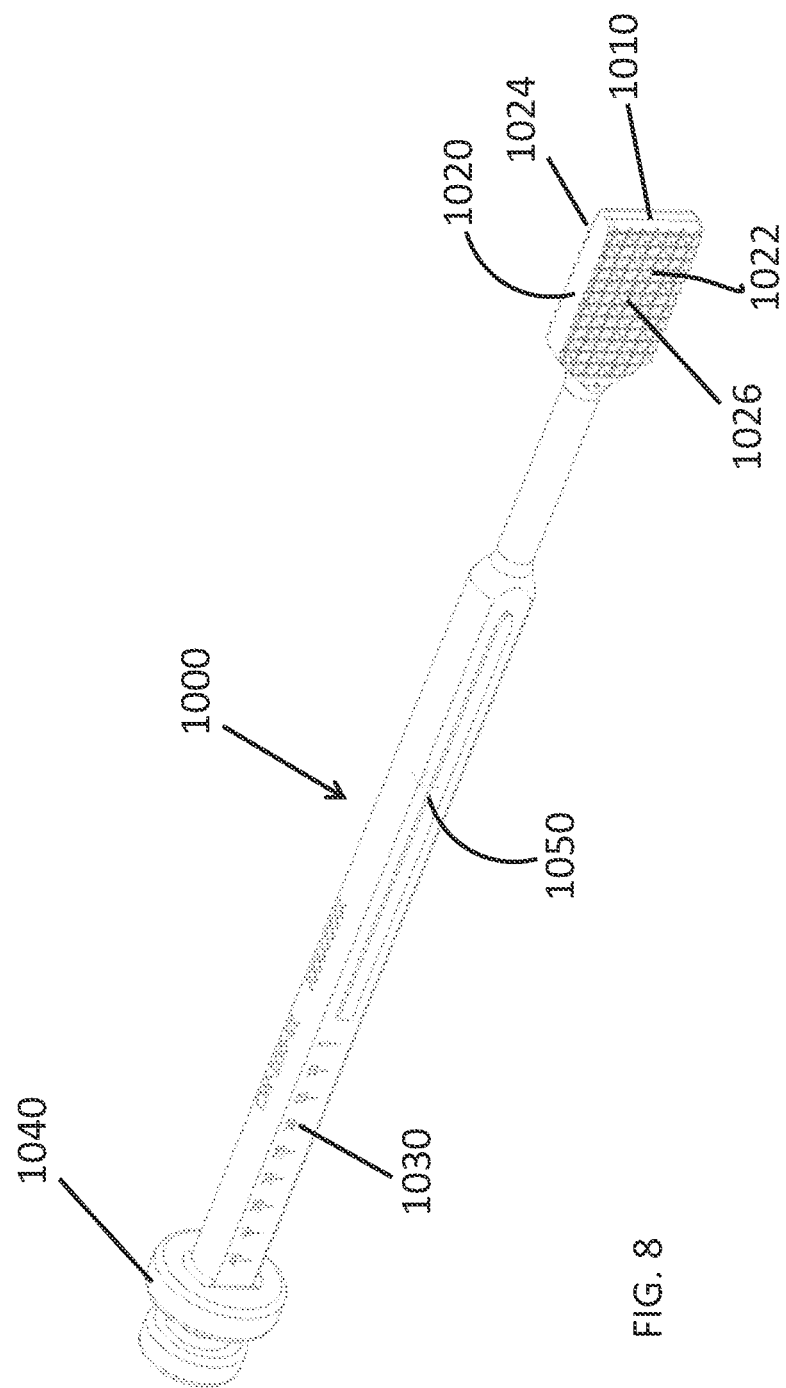
FIG. 8 is a side view of an exemplary joint rasp (1000), with a proximal end having a rounded leading edge (1010), two flat sides (1026, 1024), each of which has a pattern of sharp diamond shaped structures (1022), lateral markings (1030) facilitating control of cutting depth, and a cylindrical head (1040).

Referring to FIG. 8, the joint rasp (1000) has a suitable width, allowing it to operate within the working cannula. It may have a rounded leading edge (1010), facilitating its insertion into an unprepared cavity within the joint. Its dimensions are selected to prepare the joint for insertion of the implant. Its height and width are based on the size of the implant and it allows for insertion of the implant with minimal force, but also prevents breakage during insertion.

The proximal end (1020) of the rasp contains two generally flat sides (1024 and 1026), each of which has a pattern of sharp rectangular or diamond shaped structures (1022) protruding therefrom, creating an abrasive surface. The abrasive surfaces aid in cutting away uneven areas and preparing the two surfaces of the joint for the implant.

The rasp has a long rail (1050) running down the length of its body, located on an outer surface, that acts as a guide within the working cannula. The rail is configured to fit inside the long slot (292) located on a wall of the cavity (290) of the working cannula, allowing the rasp to slide up and down along the rectangular slot.

In some embodiments, the rasp has a plurality of graduated markings (1030) etched on its side which correspond to the depth at which the proximal end is located.

The rasp terminates at its distal end (1040). The distal end of the rasp is preferably configured for attachment to other tools to aid in inserting or removing the rasp from the site. For example, the distal end of the rasp may be configured to attach to a slap handle for insertion or removal of the tool.

G. Lateral Guide Boom

Optionally, the system includes a lateral guide boom. The lateral guide boom is configured to direct the placement of lateral fixation devices. The arm of the lateral boom guide is preferably configured to be insertable into and removable from a rectangular slot (280) in the distal end of the working cannula.

Referring to FIG. 3A, the lateral guide boom (300) can have a curved L shape, the proximal end of which ends in a paddle-shaped structure (320) with one or more drill holes (310a, 310b, 310c), configured to hold bone screws. The lateral arm (330) may be inserted into the rectangular slot (280) of the working cannula, such that it is in slidable relation thereto.

The lateral guide boom locks in place in the working cannula using a threaded capture clip. Multiple holes may be used to align with the implant or to locations directly around the implant. Other holes in the lateral guide boom provide access for screws to non-critical areas of the SI joint, facilitating adequate fixation. In certain embodiments, the system includes lateral guide booms of various sizes that may be required based on the anatomy of the patient.

H. Materials for Components of the System

The various components of the system are fabricated from biocompatible materials suitable for implantation in a human body, including but not limited to, metals, synthetic polymers, ceramics, and/or their combinations, depending on the particular application and/or preference of a medical practitioner. Further, the components of the implant system can be manufactured via various methods. For example, the implant may be manufactured and assembled via injection-molding, insert-molding, co-extrusion, pultrusion, transfer molding, overmolding, compression molding, 3-Dimensional printing, dip-coating, spray-coating, powder-coating, porous-coating, milling from a solid stock material and their combinations.

III. Methods of Use

The system disclosed herein may be used to deliver any SI joint implant or other fixation device(s) to the SI joint or SI joint region. In a preferred embodiment, the system disclosed herein is used to deliver the SI joint implants disclosed herein to an SI joint of a patient in need thereof. The inferior inlet approach provides access to the inferior aspect of the SI joint while avoiding the nerves exiting the sacrum, as well as the majority of blood vessels, ligaments, and muscles supporting the hip and lumbar region of a patient. Further, the inferior inlet approach allows for smaller incisions than the current MIS techniques for accessing the SI joint. Therefore, the inferior inlet approach reduces recovery time, risk of complications from surgery, and reduces visibility of the incision once healed.

The inferior inlet approach is disclosed herein. For delivery of the SI joint implant, the patient is preferably placed in a prone position. If desired, fluoroscopy is used to visualize the SI joint according to methods well established in the field. Preferably, the position of the fluoroscopy is an inlet view of the pelvis with an approximately 10-15 degree angle to isolate the affected SI joint. This view provides a medical practitioner with a straight view of the SI joint.

A. Accessing the Joint

A medical practitioner can access the SI joint through an incision in the skin and soft tissue of a patient. The incision may be of any size, but preferably the incision is less than one inch. The incision is made in a region below the back of a patient. Preferably, the incision is made in alignment with the longitudinal axis of the SI joint. After the incision is made, a guide wire, such as a K-Wire, or guide pin, is inserted through the incision and advanced until it reaches the SI joint. The guide wire is used to guide the sliding join finder to the desired site.

The sliding joint finder (100) is oriented over the guide wire (or pin) and slides over the wire and into the joint until the unilateral joint finder shelf (120) contacts the edge of the posterior inferior iliac spine, thereby preventing further insertion.

B. Inserting the Working Cannula

The working cannula (200) is inserted over the sliding joint finder. Preferably, the working cannula is configured such that when it is properly inserted in the SI Joint, the longer protrusion is located at the superior end, while the shorter protrusion is located at the inferior end of the SI joint (FIG. 10). If necessary, the distal end (210) of the working cannula is impacted with a device, such as a mallet, to push it into the SI Joint. The working cannula is inserted into the body until the unilateral shelf (260), which is located in the proximal end of the working cannula, contacts the edge of the posterior inferior iliac spine, thereby preventing further insertion.

After insertion of the working cannula, the sliding joint finder and the K-Wire are removed, leaving the working cannula docked in the SI joint (FIG. 10).

C. Preparing the SI Joint

An SI surface removal instrument is inserted into the working cannula. In some embodiments, the instrument is a drill guide (1100). In some embodiments, the instrument is a box chisel (900). In some embodiments, the instrument is a rasp (1000).

When a drill guide is used, it is inserted in a first position in the working cannula. The drill guide may have one, two, three, or four overlapping holes (1110a, 1110b). In use, the drill guide is inserted into the working cannula until it reaches the SI joint. Then a suitable sized drill bit (attached to a drill) is placed in the first hole and the bone is drilled to remove the bone. Preferably a stop portion is provided along the drill bit at the distal end of the drill guide to prevent over insertion of the drill bit (and over drilling). The drill bit is then moved to the second hole and the second hole is drilled. After both holes are drilled, the drill guide is removed from the working cannula, rotated 180 degrees axially, and reinserted into the working cannula. The drilling procedure described above is repeated to drill two additional holes in the bone.

Using above-mentioned tools, cartilaginous/fibrous tissue on either side of the SI joint is removed. This results in a suitable environment for bone growth to promote fusion of the SI joint. If needed, a rasp or other suitable device is inserted into the working cannula for additional preparation of the SI joint space. The rasp may be used to roughen the bone surface to prepare for fusion. An exemplary rasp is illustrated in FIG. 8.

D. Inserting the Implant

If necessary, after the SI Joint is prepared, an implant is inserted and then fixed in the prepared SI Joint.

First the desired size and shape implant is selected and placed in the insertion end (510) of the implant insertion tool (500). An implant having the desired size and shape (600a, 600b, 600c, 600d) is loaded into the implant insertion tool. In some embodiments, two or three implants are loaded at one time. In some embodiments, the implants are of varying lengths.

The proximal end of the slidable insertion guide is inserted into a hole at the end of the implant.

When the implant is placed in the insertion end (510) of the implant insertion tool (500), the cap (565) of the slidable insertion guide is in its retracted position.

Then the insertion tool (500) is inserted into the working cannula until the proximal end (556) of the handling region (550) contacts the flange (202) at the distal end (210) of the working cannula. In this position, the insertion end (510) is located in the proximal end (240) of the working cannula and is located between the superior and inferior protrusions (240a, 240b).

Then a user pushes the cap (565) of the slidable ram into its operative position to deliver the implant to the SI Joint. When the cap is pushed, the body portion (562) slides along the cavity until the rectangular surface (566) of the proximal end contacts and pushes the posterior surface of the implant (560).

When the cap (565) is pushed into its operative position, the cap is adjacent to the distal end of the body, and the implant is pushed out of the insertion end of the tool and into the SI Joint. The implant is located between the protrusions of the working cannula.

The location of the implant can be confirmed by any suitable imaging technique, such as X-Ray, CT scan, or MRI.

1. Implants

The implant can have any suitable shape for use in the SI joint. Preferably the implant is a spacer. Referring to FIGS. 6A-6D, the spacer (600a, 600b, 600c, 600d) may be rectangular in shape, with the height being more than twice the width. In some embodiments the spacer is 6 mm wide, allowing it to fit into the very small space between the bones of the sacrum and ilium. This allows for minimal removal of cortical bone from each face of the joint. In some embodiments the implant is 20 mm, 25 mm, 30 mm, 35 mm, or 40 mm in length, thus accounting for anatomical differences. In some embodiments the upper and lower sides of the spacer have triangular projections (640), which prevent posterior migration of the spacer, once in the SI joint. In some embodiments the implant has rounded corners (630), allowing for ease of insertion into the joint, and allowing the implant to fit easily into the insertion tool. The implant may also have a series of holes (610, 620) along its length, allowing for insertion of bone graft or bone graft substitute. In some embodiments the holes are circular, as shown in FIGS. 6A-6D. In some embodiments the holes are rectangular.

a) Materials

The implant is fabricated from biocompatible materials suitable for implantation in a human body, including but not limited to, allograft or autograft bone, metals, synthetic polymers, ceramics, and/or their combinations, depending on the particular application and/or preference of a medical practitioner. Further, the components of the implant system can be manufactured via various methods. Alternatively, the implant may be manufactured and assembled via injection-molding, insert-molding, co-extrusion, pultrusion, transfer molding, overmolding, compression molding, 3-Dimensional printing, dip-coating, spray-coating, powder-coating, porous-coating, milling from a solid stock material and their combinations.

In the preferred embodiment, the implant is formed from allograft bone. In other embodiments, the implant is fabricated from another biocompatible material, such as commercially pure titanium, titanium alloys, Grade 5 titanium, super-elastic titanium alloys, cobalt-chrome alloys, stainless steel alloys, superelastic metallic alloys (e.g. nitinol, Elgiloy (a Co—Cr—Ni Alloy)), carbon fiber, thermoplastics such as polyaryletherketone (PAEK), including polyetheretherketone (PEEK) and polyetherketone (PEK), carbon fiber reinforced PEEK composites, PEEK-BaSO$_4$ composites, ceramics and composites thereof, such as calcium phosphate (e.g. SKELITE™), rigid polymers including polyphenylene, polyamide, polyimide polyetherimide, polyetherimide, polyethylene, polyurethanes of any durometer, epoxy, or silicone. Different components of the SI implant system may be fabricated from a heterogeneous material, such as a combination of two or more of the above described materials to achieve various desired characteristics such as strength, rigidity, elasticity, compliance, biomechanical performance, durability and radiolucency or imaging preference.

ii) Cavity Filler

In certain embodiments the implant has a cavity. In these embodiments, the implant cavity may be filled with suitable biocompatible materials to facilitate joint fixation or fusion. Suitable biocompatible materials include, but are not limited to bone material including autograft, allograft, xenograft or transgenic cortical and/or corticocancellous bone, and tissue growth or differentiation factors, partially resorbable materials, such as composite of metals and calcium based ceramics, composites of PEEK and calcium based ceramics, composites of PEEK with resorbable polymers, totally resorbable materials, such as calcium based ceramics such as calcium phosphate, tri-calcium phosphate (TCP), hydroxyapatite (HA)-TCP, calcium sulfate, or other resorbable polymers such as polylactide, polyglycolide, polytyrosine carbonate, and their combinations.

b) Active Agents

Optionally, a wide range of bioactive factors can be applied in the form of a coating or otherwise integrated into the surface of the implant to aid in SI joint fixation by inducing and supporting healing, repair and regeneration of soft and hard tissue, in particular, bone and cartilage. Suitable factors include, but are not limited to, autologous bone from ipsilateral posterior superior iliac spine, nucleotides, peptides, proteins, antibodies, biocompatible chemical compounds, and other pharmaceuticals. Preferred bioactive factors include parathyroid hormones (PTHs), platelet-derived growth factors (PDGFs), Transforming growth factor betas (TGF βs), bone morphogenetic proteins (BMPs), vascular endothelial growth factor (VEGFs), Insulin-like growth factors (IGFs), Fibroblast Growth Factors (FGFs), and variants having the same effect in the human or animal body. Most preferred bioactive factors include autologous bone graft, PDGF AB, PTH1-34, BMP2, BMP 7, TGF β1, TGF β3, VEGF 121, and VEGF 110. Other suitable bioactive factors include, but are not limited to, antibiotics, chemotherapeutics, analgesics, anesthetics, anti-proliferating agents, and immunomodulators.

E. Fixation of Implant

Optionally, after the correct location of implant or implants has been confirmed, one or more fixation elements may be inserted. An SI joint implant may be secured within the SI joint by one or more, typically two or more, fixation elements. Typically, the fixation elements are inserted adjacent to the implant. Optionally, the fixation elements can be inserted either through the prepared holes of an implant, or through a new hole drilled directly through the implant, which is intended to provide compression and to fix the implant within the joint space.

For example, imaging techniques can be used to determine the locations for fixation screws for fixation of the implant. Using imaging techniques, K-wires may be inserted into the patient's body until they reach the implant. Next cannulated screws are placed over the K-wires and turned until they reach the desired location. One or more of the screws typically pass through a portion of the implant and into the adjacent bone to fix the implant in place.

Alternatively, after the correct location of implant or implants has been confirmed, a lateral guide boom (300) can be used to determine the exact location of the lateral fixation screws.

The lateral guide boom has a curved L-shape, that, once inserted into the lateral rectangular slot (280) of the working cannula, has an arm (330) running perpendicular, and a second arm (340) located parallel to the working cannula. The arm (340) running parallel to the working cannula ends in a paddle-like structure (320) that aligns with the two protrusions (240*a*, 240*b*) of the working cannula, as well as with the implant. The paddle-like structure (320) has holes (310*a*, 310*b*, 310*c*) that align with the location for screw holes for fixation of the implant.

The paddle structure is positioned outside the body, directly above the location of the implant. Using imaging techniques, K-wires are inserted through the holes and into the patient's body until they reach the implant. Then, the lateral guide boom is removed from the working cannula. Next cannulated screws are placed over the K-wires and turned until they reach the desired location. One or more of the screws typically pass through a portion of the implant and into the adjacent bone to fix the implant in place.

1. Fixation Elements

A fixation element is any suitable element for attaching an implant, such as a spacer, to a bone, such as a screw, nail, or rod. Preferably, the fixation elements are titanium bone screws; preferably the bone screws are cannulated.

The bone screws can be of any standard type, but are preferably self-tapping, cannulated, low-profile, hexalobe or hexagon drive, flat-head type of bone screw. In other embodiments, the fixation elements are made of any suitable biocompatible material, including non-biodegradable and biodegradable materials.

In other embodiments the fixation elements are pins, rods, or other suitable structures for fixating the implant within the joint space.

Fixation elements can be fabricated from biocompatible materials such as titanium, titanium alloys, Grade 5 titanium, super-elastic titanium alloys, cobalt-chrome alloys, stainless steel alloys, superelastic metallic alloys (e.g. nitinol, (e.g. nitinol, Elgiloy (a Co—Cr—Ni Alloy)), stainless steel, carbon fiber or combinations thereof.

Optionally, this SI joint system can be used in conjunction with a separate system for inserting fixation elements.

IV. Kits

The system described herein may be provided in a kit for preparing the SI joint and, optionally, delivering an implant to the SI joint. In a preferred embodiment, the kit contains a sliding joint finder and a working cannula. The kit may also contain an implant insertion tool. The kit may also contain one or more tools for preparing the SI Joint, such as a drill guide and/or an SI joint box Chisel.

Optionally, the kit contains additional components, such as an SI joint rasp, a guide for fixation elements, and/or one or more fixation elements.

The kit typically contains instructions for care and use of the system.

In one embodiment, the kit can include tools and materials for inserting bone graft material. For example, the kit can include a syringe or other apparatus for injecting bone graft material.

In some embodiments, one or more implants are provided in a kit with the system described herein. Preferably, the implant is provided separately from the tools used for preparing and implanting the implants. In a preferred embodiment, an implant provided separately is sterilely packed and preserved in a saline solution, lyophilized, or preserved by some other means. A variety of different sized implants are typically provided to allow for selection of the properly sized implant for an individual due to diversity in patients' anatomies.

While several embodiments are described in connection with the figures described herein, there is no intent to limit the disclosure to the embodiment or embodiments illustrated therein.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

The invention claimed is:

1. A surgical system for preparing the sacroiliac (SI) joint for a fusion, comprising a sliding joint finder, a lateral guide boom and a working cannula;
   a) wherein the sliding joint finder comprises:
      i) a central axis with a hole that runs the length of the sliding joint finder;
      ii) a unilateral shelf located on an outer surface of the sliding joint finder; and
   b) wherein the working cannula comprises a body having a central axis that runs the length of the body;
      wherein the body of the working cannula comprises a distal end, a proximal end and a central cavity that is positioned along the central axis of the working cannula and has suitable dimensions for sliding the working cannula over the sliding joint finder;
      wherein the working cannula further comprises two protrusions extending proximally; and
      wherein the two protrusions have uneven lengths such that when the working cannula is inserted into the SI joint over the sliding joint finder, the longer of the two protrusions is configured to engage the SI joint at a superior end of the SI joint and the shorter of the two protrusions is configured to engage the SI joint at an inferior end of the SI joint
      wherein the lateral guide boom comprises a proximal end with a paddle shaped structure with one or more drill holes, configured to receive bone screws, a lateral arm configured to be inserted into a rectangular slot of the working cannula, and
      wherein the lateral guide boom is configured to be locked to the working cannula with a threaded capture clip.

2. The surgical system of claim 1, further comprising an implant insertion tool, wherein the implant insertion tool comprises an elongated body and a slidable insertion ram;
   wherein the body of the insertion tool comprises an insertion region and an insertion end, and a central cavity that runs along a central axis of the insertion tool;
   wherein the slidable insertion ram comprises a body portion configured to be located within in the central cavity of the working cannula and in slidable relation thereto; and
   wherein the insertion region and insertion end have suitable dimensions for insertion of a spacer implant into the working cannula.

3. The system of claim 2, wherein the insertion end of the body of the insertion tool comprises a flexible tab that can be deformed to retain one or more implants within the insertion end.

4. The system of claim 3, wherein the slidable insertion ram of the implant insertion tool is configured to push the implant(s) out of the insertion end and into the joint, when the insertion ram moves from a retracted position to an operative position.

5. The system of claim 3, wherein the insertion end of the implant insertion tool comprises a cavity configured to retain an implant, when the tab is deformed.

6. The system of claim 1, wherein the hole that runs the length of the sliding joint finder has suitable dimensions to slide over a wire or pin and allow for removal of the wire or pin from a surgical site through the sliding joint finder.

7. The system of claim 1, wherein the sliding joint finder has two lateral sides and a unilateral shelf located on only one of the lateral sides at a suitable location for contacting a shelf on the ilium, when the sliding joint finder is inserted into the SI joint with the lateral side having the unilateral shelf facing the ilium.

8. The system of claim 1, wherein the working cannula further comprises a unilateral shelf distal to the two protrusions.

9. The system of claim 1, further comprising one or more spacer implants.

10. The system of claim 9, wherein the one or more spacer implants is formed from a material selected from the group consisting of allograft, autograft bone, biocompatible metal, polymers, ceramics, and other synthetic materials.

11. The system of claim 1, wherein the cavity of the working cannula has substantially straight lateral walls.

12. The system of claim 1, further comprising one or more tools for preparing the SI Joint selected from the group consisting of drill guides and joint box chisels, wherein each of the tools has a proximal end, and wherein each of the tools has suitable dimensions for the proximal end of the tool to be inserted into the working cannula.

13. The system of claim 1, wherein the distal end of the working cannula is configured to receive a lateral guide for fixation elements.

14. The system of claim 1, wherein the cannula is configured such that when the cannula is inserted, each of the two protrusions engages the sacrum on one side of the protrusion and the ilium on the other side of the protrusion.

15. The system of claim 1, wherein the central cavity of the working cannula terminates at a proximal terminus; and
   wherein the two protrusions of the working cannula extend proximally from the proximal terminus of the central cavity.

16. The system of claim 8, wherein a first distance from the longer of the two protrusions to the shelf is about 35 mm and a second distance from the shorter of the two protrusions to the shelf is about 15 mm.

17. A surgical system for preparing the sacroiliac joint for a fusion, comprising a sliding joint finder and a working cannula;
   a) wherein the sliding joint finder comprises:
      i) a central axis with a hole that runs the length of the sliding joint finder;
      ii) a unilateral shelf located on an outer surface of the sliding joint finder; and
   b) wherein the working cannula comprises a body having a central axis that runs the length of the body;
      wherein the body of the working cannula comprises a distal end, a proximal end and a central cavity that is positioned along the central axis of the working cannula and has suitable dimensions for sliding the working cannula over the sliding joint finder, the body including a first side and a second side that opposes the first side;
      wherein the first side of the body of the working cannula includes a first marking configured to identify that the first side is configured to face the ilium and the second side of the body of the working cannula includes a second marking configured to identify that the second side is configured to face the sacrum, the second marking being different from the first marking;

wherein the working cannula further comprises a first protrusion and a second protrusion extending proximally; and wherein the first protrusion is longer than the second protrusion such that when the working cannula is inserted into the SI joint over the sliding joint finder, the first side is configured to face the ilium, the second side is configured to face the sacrum, the first protrusion is configured to engage the SI joint at a superior end of the SI joint, and the second protrusion is configured to engage the SI joint at an inferior end of the SI joint, wherein the lateral guide boom comprises a proximal end with a paddle shaped structure with one or more drill holes, configured to receive bone screws, a lateral arm configured to be inserted into a rectangular slot of the working cannula, and wherein the lateral guide boom is configured to be locked to the working cannula with a threaded capture clip.

18. The system of claim 17, wherein the first marking is an "I".

19. The system of claim 17, wherein the second marking is an "S".

20. The system of claim 17, wherein the working cannula further comprises a unilateral shelf distal to the two protrusions, a first distance from the first protrusion to the shelf being about 35 mm and a second distance from the second protrusion to the shelf being about 15 mm.

* * * * *